United States Patent [19]

Stehlin

[11] 4,123,095

[45] Oct. 31, 1978

[54] PIPE CLAMP HAVING AN OVERCENTER TOGGLE

[75] Inventor: Theodore A. Stehlin, Pasadena, Calif.

[73] Assignee: Hansted Corporation, Carson City, Nev.

[21] Appl. No.: 811,783

[22] Filed: Jun. 30, 1977

[51] Int. Cl.² .................. F16L 23/00; F16L 37/20
[52] U.S. Cl. ............................ 285/409; 24/270; 285/411
[58] Field of Search ............ 285/365, 366, 411, 410, 285/408, 407, 409; 24/270, 271, 272, 285

[56] References Cited

U.S. PATENT DOCUMENTS

| | | | |
|---|---|---|---|
| 1,185,487 | 5/1916 | Eastman | 285/409 X |
| 2,706,648 | 4/1955 | Gosse | 285/409 |
| 2,775,806 | 1/1957 | Love | 285/411 X |
| 2,994,934 | 8/1961 | Kraus | 285/409 X |
| 3,042,430 | 7/1962 | Guy | 285/365 |
| 3,201,156 | 8/1965 | Coats | 285/409 X |
| 3,246,793 | 4/1966 | Wade | 285/365 X |
| 3,967,837 | 7/1976 | Westerlund et al. | 285/365 X |

FOREIGN PATENT DOCUMENTS

| | | | |
|---|---|---|---|
| 2,001,628 | 7/1971 | Fed. Rep. of Germany | 285/365 |
| 1,334,953 | 7/1963 | France | 285/365 |
| 638,761 | 6/1950 | United Kingdom | 285/411 |

Primary Examiner—Thomas F. Callaghan
Attorney, Agent, or Firm—Edward D. O'Brian

[57] ABSTRACT

A clamping structure for use in holding adjacent, aligned, flanged pipe ends together can be constructed utilizing a band consisting of a plurality of elongated coupling segments located in end-to-end relationship. Each of the clamping structures includes a clamping surface; these clamping surfaces are dimensioned so that when the band is in position around the flanged ends the clamping surfaces engage and fit closely against the flanges on the pipes so as to hold the flanges together. A locking arm is pivotally mounted on one of the terminal ends of the band. A latching element is carried by the locking arm in such a manner that the arm may be pivoted between a position in which the latching element is spaced from the latch retainer for removal and/or for installation of the band and a position in which the latching element engages the retainer so as to secure the band in position. The latching element is preferably adjustably mounted on the locking arm so that its position relative to the locking arm may be varied.

1 Claim, 5 Drawing Figures

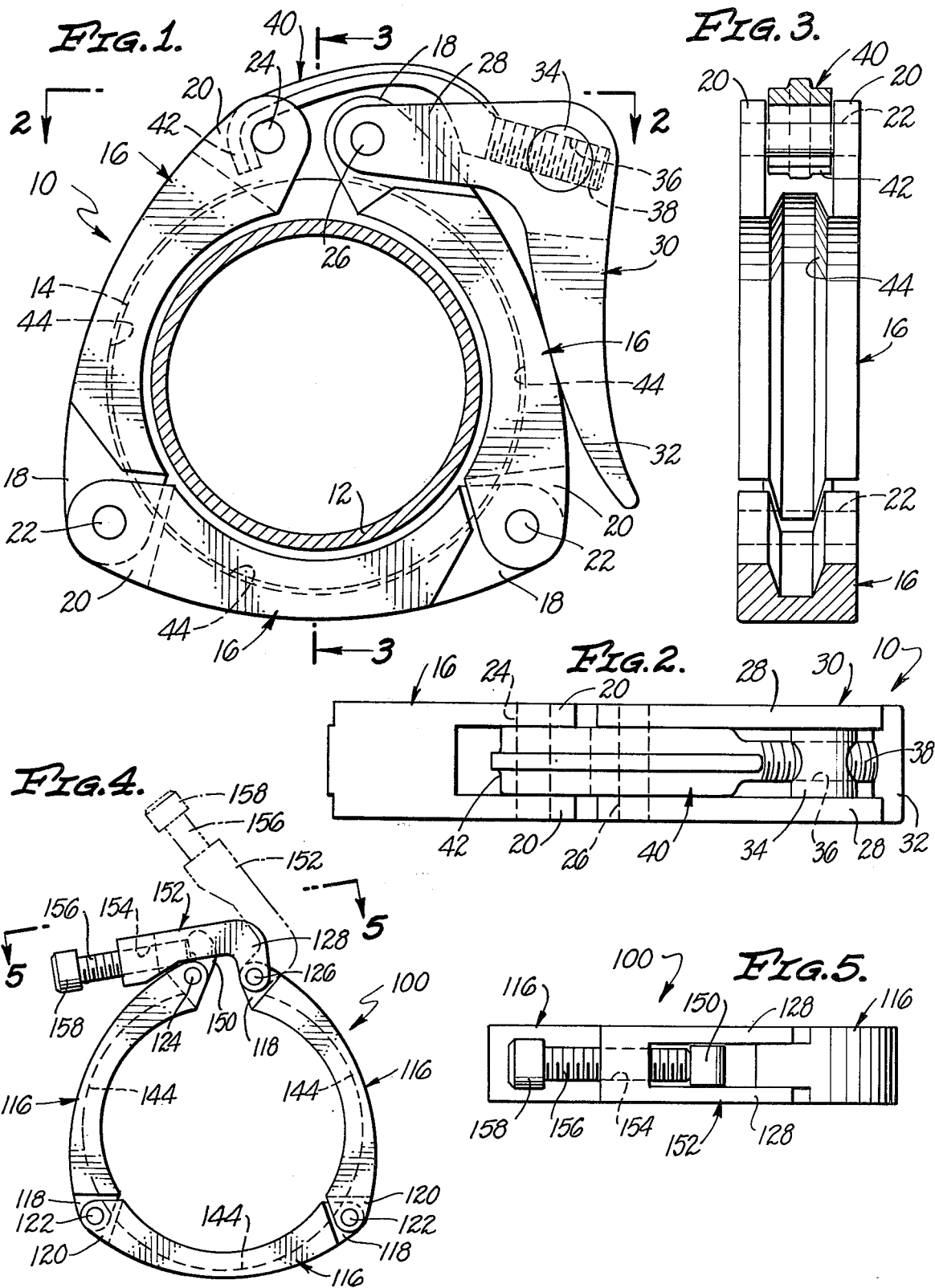

//  4,123,095

PIPE CLAMP HAVING AN OVERCENTER TOGGLE

BACKGROUND OF THE INVENTION

The invention set forth in this specification pertains to new and improved clamping structures which are primarily intended for use in holding adjacent, aligned, flanged pipe ends with respect to one another. The clamping structures of the invention are, however, capable of being utilized in other applications. Thus, for example, they can be utilized to secure aligned, circular, flanged, housing sections as are employed for a variety of purposes with respect to one another.

In a sense it may be considered that the present invention relates to the field of pipe connectors and/or couplings since the clamping structures of the invention are intended to be utilized in securing flanged pipe ends to one another so as to connect or couple such pipes with one another. The fact that many different types of pipe connectors and couplings have been proposed and used is considered to be a matter of common knowledge. It is not considered that an understanding of this invention requires a detailed discussion of many such common fittings or couplings. All sorts of connectors, couplings, unions, and the like are indicated in many common books discussing tubing and piping connections.

In many applications it is necessary and/or desirable to utilize pipe coupling structures which are of such a character that they can easily and conveniently be detached from and attached to pipes. Such easily and quickly utilized connectors are desirable because they minimize the amount of time required to and the amount of difficulty involved in assembling and disassembling piping. In many industries such as the food industry it is frequently necessary to assemble and disassemble either a part of or an entire piping system quite frequently in order to maintain desired standards of cleanliness.

In applications such as in the food industry and in other industries it is frequently considered desirable to utilize pipe provided with flanged ends which are adapted to be clamped together so as to secure adjacent sections of pipe together. There are many reasons for this, some of which are unimportant for an understanding of the present invention. Frequently the use of flanged ends on pipe is considered desirable because such flanged ends are considered to be less apt to contain and/or retain contaminants than the ends utilized with other types of coupling structures. In general, however, the use of flanged ends on pipe in connection with a known type of coupling type structure for securing such ends together is considered to be relatively disadvantageous or undesirable.

This is because of the problem of providing a satisfactory structure for clamping such flanged ends together and in particular, the problem of providing a structure for this purpose which may be easily and conveniently operated so as to minimize the amount of time required in either connecting pieces of pipe together and/or in disassembling such pieces of pipe. Although many different clamping structures for this purpose have been proposed and utilized, in general such prior structures are not considered to be as desirable as reasonably possible.

As an illustration of this it is known to clamp flanged pipe ends together utilizing a continuous, elongated, generally circular band having an internal groove dimensioned so as to accommodate to the external configuration of the flanges on the ends when such flanges are against one another, and to secure the ends of such a band so that the band is held against the flanges through the use of a conventional type fastener. Structures of this type are not particularly easy to utilize and are frequently of such a character that they are apt to be bent as they are being manipulated when they are being removed from or attached to the flanges on pipe ends.

SUMMARY OF THE INVENTION

A broad objective of the present invention is to provide new and improved clamping structures which overcome various disadvantages of prior structures as are indicated in the preceding discussion. A further objective of the present invention is to provide new and improved clamping structures for use in holding adjacent, aligned, flanged pipe ends with respect to one another which may be easily and conveniently manufactured at a comparatively nominal cost, which may be easily and conveniently utilized in a comparatively rapid manner in connecting or detaching pipe, which are quite reliable in character, and which are capable of being utilized many times without there being any significant danger of these clamping structures being damaged.

In accordance with this invention these and various related objectives as will be apparent from a consideration of the remainder of this specification are achieved by providing a clamping structure for use in holding adjacent, aligned, flanged pipe ends with respect to one another which comprises: a band comprising a plurality of elongated clamping elements located in end-to-end relationship, said band having terminal ends, each of said segments having a clamping surface comprising an internal groove which is curved throughout its length so as to correspond to the curvature of said flanged pipe ends and which has a cross-sectional configuration corresponding to the cross-sectional configuration of the exteriors of said flanges when said pipe ends are adjacent and aligned with one another, each of said clamping surfaces extending less than one hundred eighty degrees around the circumference of said pipe ends, a pivot means located so as to connect each pair of adjacent ends of said segments so that said segments can be pivoted relative to one another, said band being of less length than the circumference of said flanged ends and being of such dimension that such segments engage only these flanges on said pipe ends when located so that said grooves fit over said flanges on said pipe ends, a locking arm pivotally mounted on one of said terminal ends, a latch retainer located on the other of said terminal ends, and a latching element located on said latching arm, said latching element being capable of engaging said retainer so as to hold said terminal ends adjacent to one another in one position of said locking arm.

BRIEF DESCRIPTION OF THE DRAWING

Because of the nature of the invention it is best more fully described with reference to the accompanying drawing in which:

FIG. 1 is a side elevational view of a presently preferred embodiment or form of a clamping structure of the present invention in use upon aligned, flanged pipe ends;

FIG. 2 is what may be regarded as a top-plan view taken at line 2—2 of FIG. 1 showing the clamping structure, this view omitting the pipe ends illustrated in FIG. 1;

FIG. 3 is a cross-sectional view taken at line 3—3 of FIG. 1 in which the pipe ends are not shown;

FIG. 4 is a view similar to FIG. 1 of a modified clamping structure as it would appear when installed upon flanged pipe ends (not shown); and FIG. 5 is what may be regarded as a top plan view taken at line 5—5 of FIG. 4 of the clamping structure illustrated in FIG. 4.

The structures illustrated in the accompanying drawing utilize the operative concepts or principles of the present invention as are specifically set forth and defined in the appended claims forming a part of this specification. Because these concepts or principles can be utilized in various somewhat differently appearing and somewhat differently constructed structures which differ from the specific structures illustrated as to matters of routine design skill, the invention is not to be considered as being limited to clamping structures which are precisely as illustrated.

Detailed Description

In FIG. 1 of the drawing there is shown a presently preferred embodiment of the clamping structure 10 of the present invention which is utilized to secure two aligned pipe ends 12 together. These pipe ends 12 are provided with flanges 14 of a known or conventional design which are adapted to be held together through the use of the structure 10. Normally a conventional sealing member (not shown) will be located between the flanges 14. Because the structure of these flanges 14 is conventional and is considered to be well known, it is not set forth in detail in this specification and/or the drawing.

The clamping structure 10 includes a band (not separately numbered) consisting of a plurality of elongated clamping segments 16 located in end-to-end relationship. Each of these segments 16 includes a tongue or tongue-like element 18 at one of its ends and two spaced, parallel ears 20 at the other of its ends. As indicated in FIGS. 1 to 3 of the drawing, the tongues 18 are dimensioned so as to fit within the ears 20 in such a manner as to form a tongue and groove type connection. The adjacent tongues 18 and ears 20 of the segments 16 are adapted to be pivotally connected by pivot pins 22 mounted on the ears 20 in such a manner that the various segments 16 may be rotated relative to one another about parallel axes (not illustrated).

The segments 16 are elongated and curved so as to fit less than one hundred eighty degrees around the axis (not separately shown) of the pipe ends 12. Preferably three of these segments 16 are utilized and each segment 16 extends slightly less than one hundred twenty degrees around the axis of a pipe end 12. Such a structure provides a terminal tongue 18 on one of the segments 16 which is spaced slightly from terminal ears 20 on another of the segments 16.

Such terminal ears 20 are traversed by a pin 24 serving as a stop element type latch retainer. This pin 24 corresponds to the pins 22 and is parallel to these pins 22. The terminal tongue 18 (which does not extend into ears 20) also carries another holding pivot pin 26 which is utilized to mount a bifurcated end 28 on a locking arm 30. This locking arm 30 is of a more or less bell-crank lever type shape; the locking arm 30 includes a handle portion 32 remote from the pin 26. The center (not separately numbered) of the locking arm 30 is used to rotatably mount an enlarged cylinder 34.

This cylinder 34 is located as illustrated, within the bifurcated ends 28 roughly midway along the length of the arm 30 between the pin 26 and the handle 32 so as to be parallel with the pin 24. This cylinder 34 is provided with a centrally located, threaded, cylindrical opening 36. A cylindrical, threaded base 38 on a latching element 40 is threaded into the opening 36 for the purpose of enabling the position of the latching element 40 to be varied with respect to the locking arm 30. This base 38 carries a resilient hook 42 which is adapted to engage the pin 24 in one position of the locking element 30 so as to secure the structure 10 firmly against the flanges 14 on the pipe ends 12.

These segments 16 are provided with internal surfaces 44 extending along their lengths which have a cross-sectional configuration corresponding to the cross-sectional configuration of the exteriors of the flanges 14 when the pipe ends 12 are adjacent to and are aligned with one another. These segments 16 are also of such dimension that they will engage only the flanges 14 and will be spaced slightly from the pipe ends 12 as the structure 10 is utilized.

The locations of the pins 24, 26 and the cylinder 34 are chosen with reference to the segments 16 being in a position as indicated in the preceding so that the locking arm 30 and the latching element 40 connect with the pin 24 so as to form an overcenter toggle (not separately numbered) serving to hold the locking arm 30 against undesired opening when the clamp structure 10 is installed. The spring pressure exerted by such an overcenter toggle action can be varied by varying the amount that the latching element 40 is screwed into the base 38.

Inasmuch as overcenter toggles are well known it is not considered necessary to more specifically describe the toggle action achieved. The arm 30 can be moved between a closed position as shown in FIGS. 1 and 2 in which the clamp structure 10 is operatively locked relative to the pipe ends 12, and an open position enabling the clamp structure 10 to be removed by simply lifting up the handle 32 so as to rotate the locking arm 30 to a point where the hook 42 can be removed from the pin 24. The sequence here is, of course, reversed in installing the clamping structure 10.

In FIGS. 4 and 5 of the drawing there is shown a modified clamp structure 100 which is essentially quite similar to the clamp structure 10 described in the preceding. For convenience those parts of the clamp structure 100 which are the same or substantially the same as corresponding parts of the clamp structure 10 are not separately identified and/or described. Where necessary for explanatory purposes such parts are indicated in the drawing and in the remainder of this specification by the numerals used to indicate such parts preceded by the numeral "1".

In the clamping structure 100 the pin 124 no longer serves as a latch retainer but is utilized to rigidly support between ears 20 a small hook-like latch retainer 150. In this structure 100 the previously discussed locking arm 30 is replaced by another locking arm 152. This arm 152 corresponds to the arm 30 in that it has a bifurcated end 128 attached to a pin 126 in such a manner that the locking arm 152 may be pivoted between positions as are indicated in FIG. 4. A threaded opening 154 extending through the arm 152 is utilized to carry a bolt 156 serving as a latching element. This bolt 156 has a head 158 which may be conveniently turned in installing a structure 100 so as to cause the bolt 156 to engage the retainer 150 in order to lock or hold the structure 100 in an operative position.

I claim:

1. A clamping structure for use in holding adjacent, aligned, flanged pipe ends with respect to one another which comprises:

a band comprising a plurality of identical elongated clamping segments located in end-to-end relationship, said band having terminal ends, each of said segments having a clamping surface comprising an internal groove which is curved throughout its length so as to correspond to the curvature of said flanged pipe ends and which has a cross-sectional configuration corresponding to the cross-sectional configuration of the exteriors of said flanges when said pipe ends are adjacent and aligned with one another, each of said clamping surfaces extending less than one hundred eighty degrees around the circumference of said pipe ends.

each of said segments having a single tongue extending from one end thereof and two spaced, parallel ears extending from the other end thereof, said tongues of said adjacent ends fitting between said ears at said adjacent ends, a pivot means located so as to connect each pair of adjacent ends of said segments so that said segments can be pivoted relative to one another, said pivot means comprising pins extending between and connecting said ears and said tongues at said adjacent ends, said band being of less length than the circumference of said flanged ends, and being of such dimension that said segments only engage the flanges on said pipe ends when located so that said grooves fit over said flanges on said pipe ends, a locking arm pivotally mounted on one of said terminal ends, said locking arm including bifurcated ends, a pin serving as a latch retainer located on the other of said terminal ends, a latching element located on said locking arm, said latching element including a cylindrical member pivotally mounted on said bifurcated ends and a hook element, said cylindrical member having a threaded opening therein, said hook element including a rigid threaded base portion threaded within said opening in said cylindrical member, and a non-cylindrical elongated resilient section extending from the rigid base portion and having an inwardly bent hook adapted to engage said pin serving as a latch retainer, said latch retainer, said latching element, and said locking arm form an overcenter toggle holding said locking arm in place when said clamping structure is in use.

* * * * *